Sept. 11, 1962  J. H. FULCHER  3,053,351
STRUCTURAL DEVICE

Filed Feb. 19, 1960  7 Sheets-Sheet 1

Junius H. Fulcher
INVENTOR.

BY Hayden & Pravel
ATTORNEYS

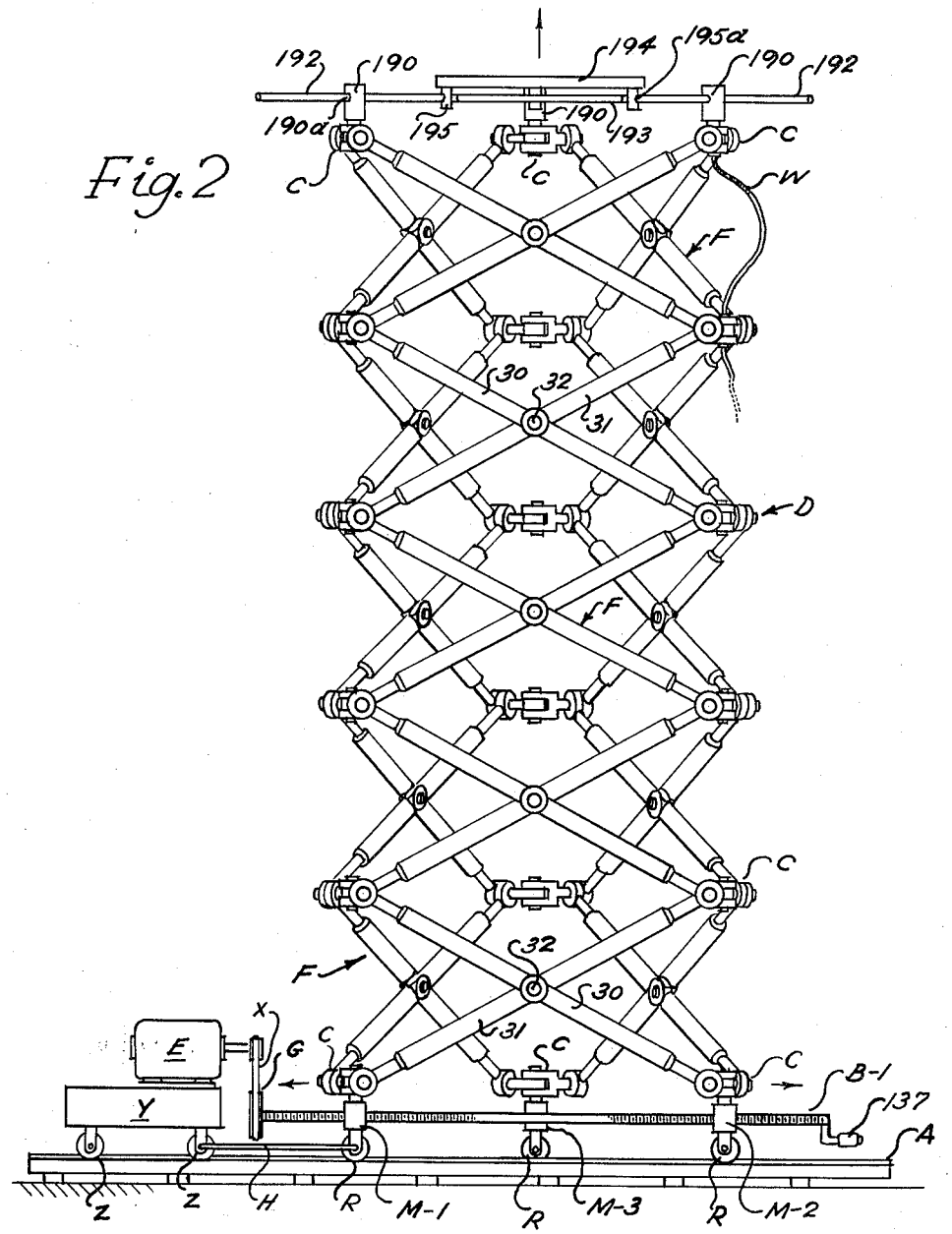

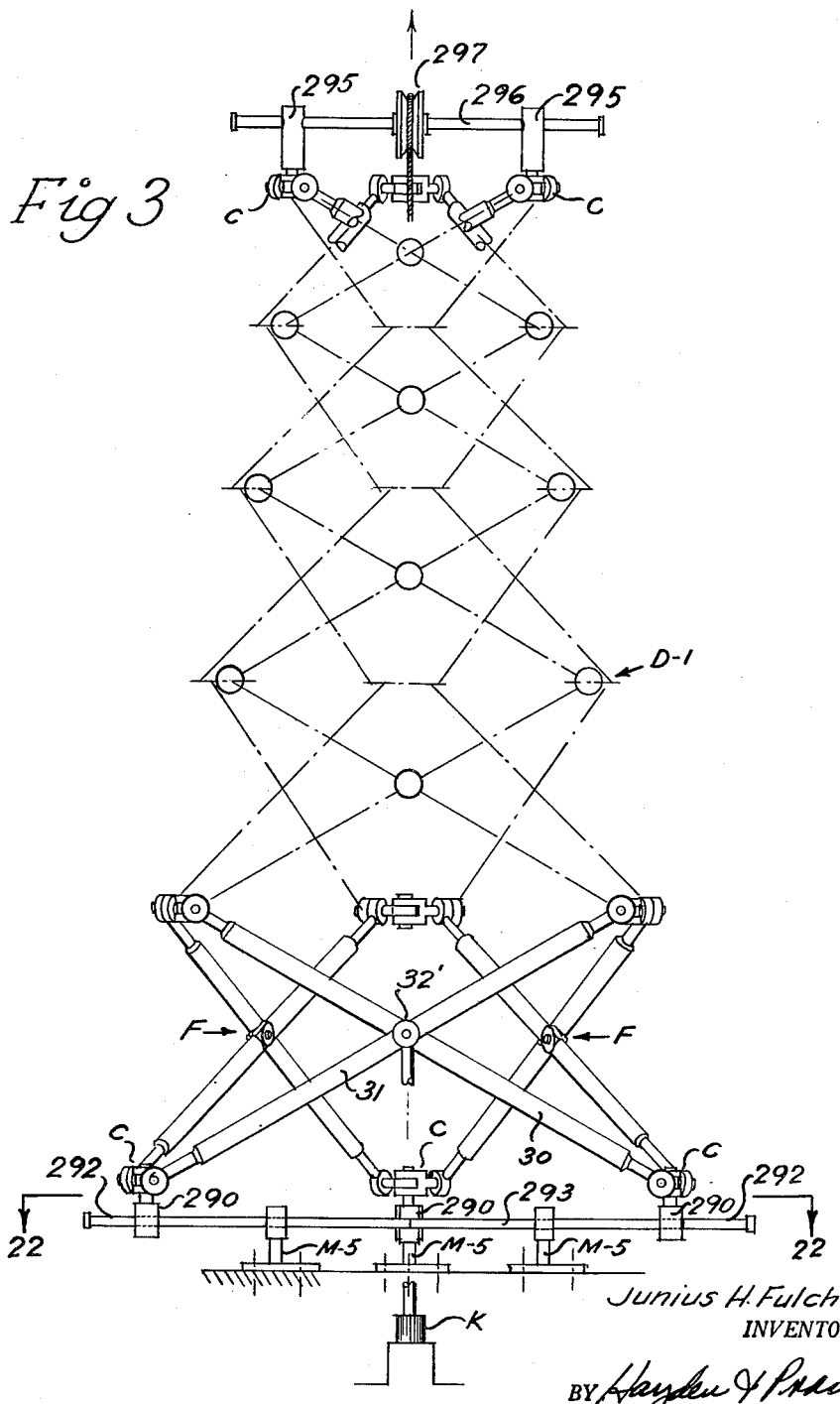

Sept. 11, 1962  J. H. FULCHER  3,053,351
STRUCTURAL DEVICE
Filed Feb. 19, 1960  7 Sheets-Sheet 4
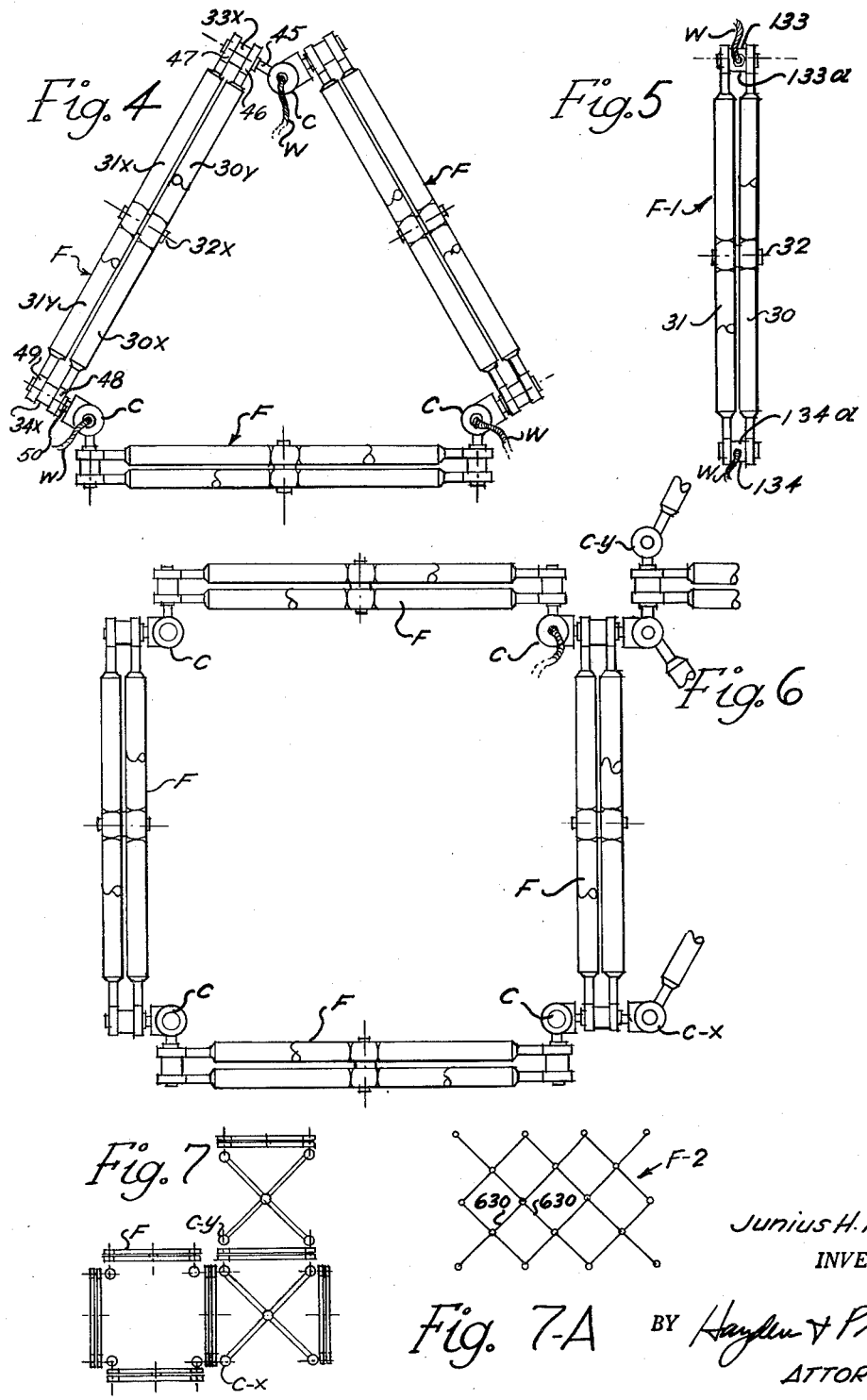
Junius H. Fulcher
INVENTOR.
BY Hayden & Pravel
ATTORNEYS Sept. 11, 1962　　　J. H. FULCHER　　　3,053,351
STRUCTURAL DEVICE
Filed Feb. 19, 1960　　　　　　　　　　　　　　　7 Sheets-Sheet 5
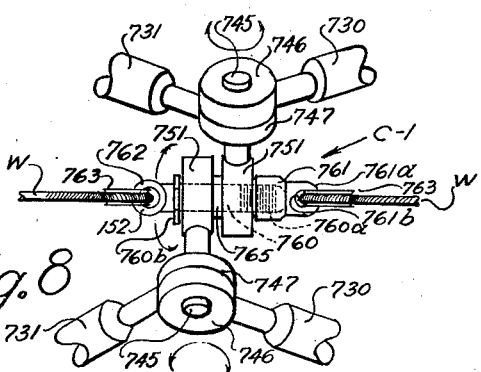
Fig. 8
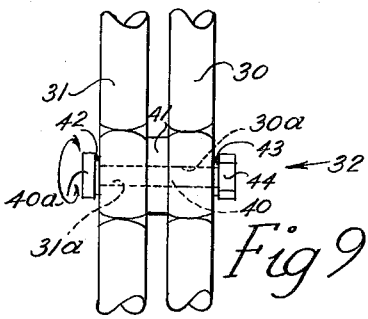
Fig. 9
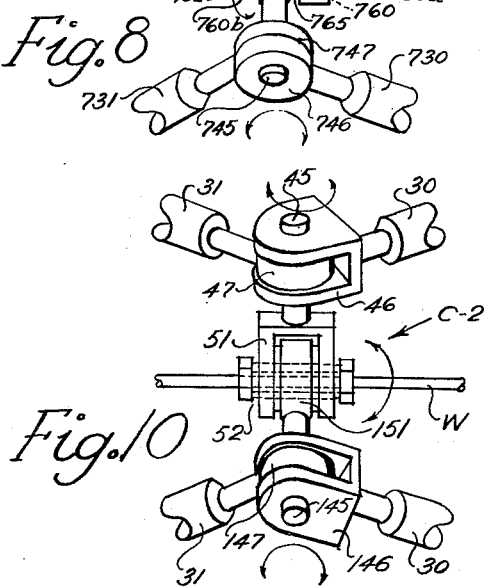
Fig. 10
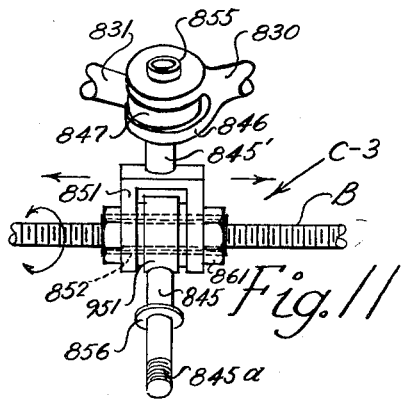
Fig. 11
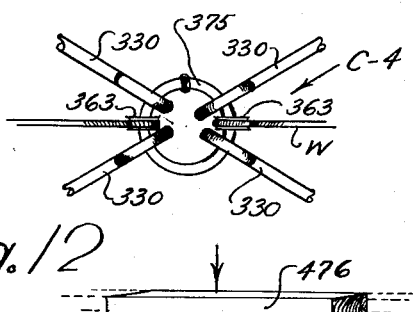
Fig. 12
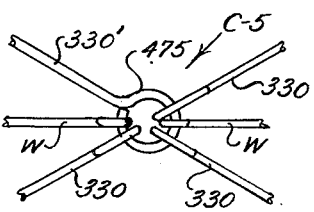
Fig. 13
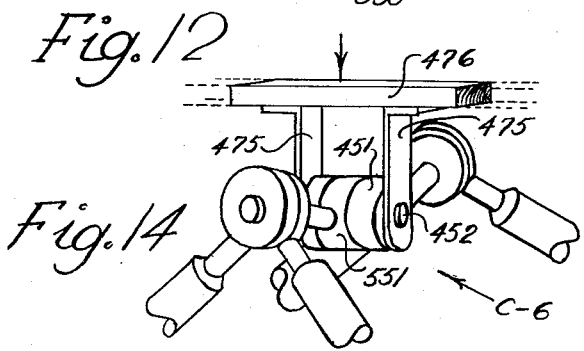
Fig. 14
Junius H. Fulcher
INVENTOR.
BY 
ATTORNEYS

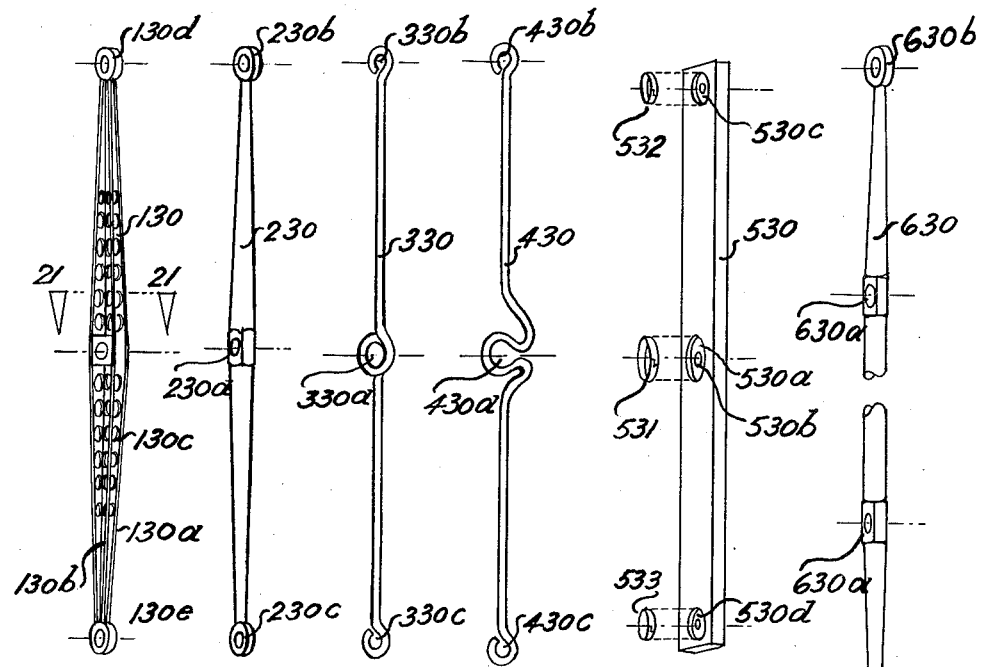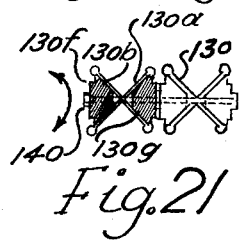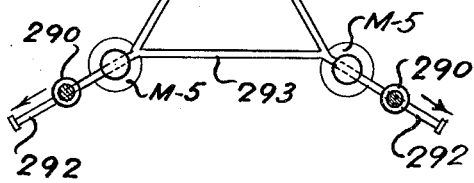

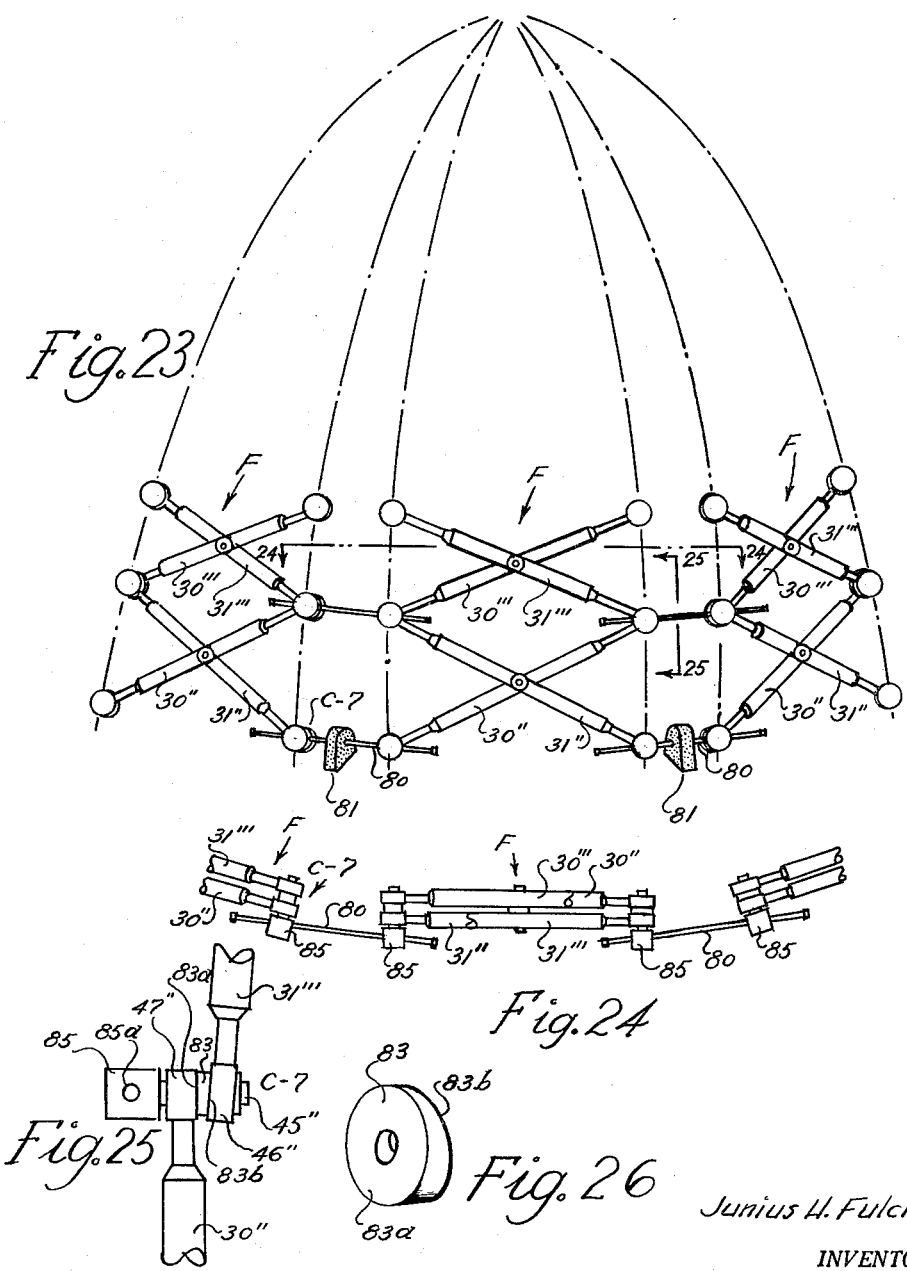

United States Patent Office 3,053,351
Patented Sept. 11, 1962

3,053,351
STRUCTURAL DEVICE
Junius H. Fulcher, 1510 Richelieu St., Houston, Tex.
Filed Feb. 19, 1960, Ser. No. 9,955
4 Claims. (Cl. 189—2)

The present invention relates to a new and improved structural device.

An object of the present invention is to provide a new and improved structural device which may be extended to a pre-selected position and collapsed as desired.

Another object of the present invention is to provide a new and improved structural device which is dynamic as well as static.

Still another object of the present invention is to provide a new and improved device wherein a plurality of rotating joints is employed which permits the device to move slightly under stress and to balance the stress throughout the device.

A further object of the present invention is to provide a new and improved structural device which may be loaded in such a manner as to create tension in both the top and bottom chords when used horizontally thereby giving greater strength in proportion to the weight of materials used.

A still further object of the present invention is to provide a new and improved structural device which may be fabricated, transported in a collapsed state, and quickly expanded for use in the erection of buildings, bridges and other constructions wherein structural devices may be used.

Yet a further object of the present invention is to provide a new and improved type of structural device wherein such device is adjustable to any length and provides support between supports of varying distances and within its strength limitations.

Yet a further object of the present invention is to provide a new and improved type of structural device which may be placed in a pre-stressed condition by the use of threaded bars or turnbuckles acting in themselves as tensile members.

Yet a further object of the present invention is to provide a new and improved structural device wherein a covering or skin may be placed over such device and stressed thereby causing the skin to act as a part of the load bearing system.

The device of the present invention can be used in the construction of numerous types of vertical structures, such as radio and TV antennas, radar masts, oil and gas drilling platforms or rigs, and can be raised, lowered, collapsed or stabilized as desired. In addition it may also be used to raise or lower an elevator or may even serve as a portable elevator itself.

By progressively shortening the compressive or strut members of the structural device compound leverage is engendered which permits the device to be used as a jack.

One rather unique advantage of the structural device of this invention over previous structural devices is that the scissors action at the joints of the present device provides sufficient leverage to crack ice which may have accumulated on it when used under extreme weather conditions. For the device to be used effectively in this situation it is necessary that only the lower part of the device be housed or protected against icing conditions.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

FIG. 2 is a side elevation illustrating one form of the present invention when used vertically and further shows a means of raising or lowering the device;

FIG. 3 is a side elevation similar to FIG. 2 but illustrates a form of the invention wherein the frame members are progressively shortened and also shows the invention in use as a movable boom activated by a mechanical or hydraulic arm;

FIG. 4 is a view taken on line 4—4 of FIG. 1 and illustrates one application of the device;

FIG. 5 is a sectional view illustrating the use of the device in a single plane;

FIG. 6 is a sectional view illustrating a further application of the device;

FIG. 7 is a schematic view illustrating one means of compounding the device so that it may be expanded or collapsed in more than one direction;

FIG. 7A is a schematic view illustrating a modified form of the invention wherein the frame members have a plurality of intermediate connections.

FIG. 8 illustrates one type of joint which is used to connect two or more side frames together;

FIG. 9 illustrates one type of pivotal connection which is used to connect the frame members together;

FIGS. 10–14 illustrate additional types of connections used to connect two or more frames together;

FIGS. 15–20 illustrate various forms of frame members which can be used with the device of the present invention;

FIG. 21 is a view taken along line 21—21 of FIG. 15;

FIG. 22 is a sectional view similar to that of FIG. 4 and illustrates the use of a movable platform or mounting;

FIG. 23 is a side elevation illustrating the use of the device in dome construction;

FIG. 24 is a partial sectional view further illustrating the use of the device in dome construction;

FIG. 25 is a view in elevation illustrating the type of joint used with the form of the device shown in FIG. 23; and FIG. 26 is a perspective view of the disc used in the joint illustrated in FIG. 25.

Figure 1:
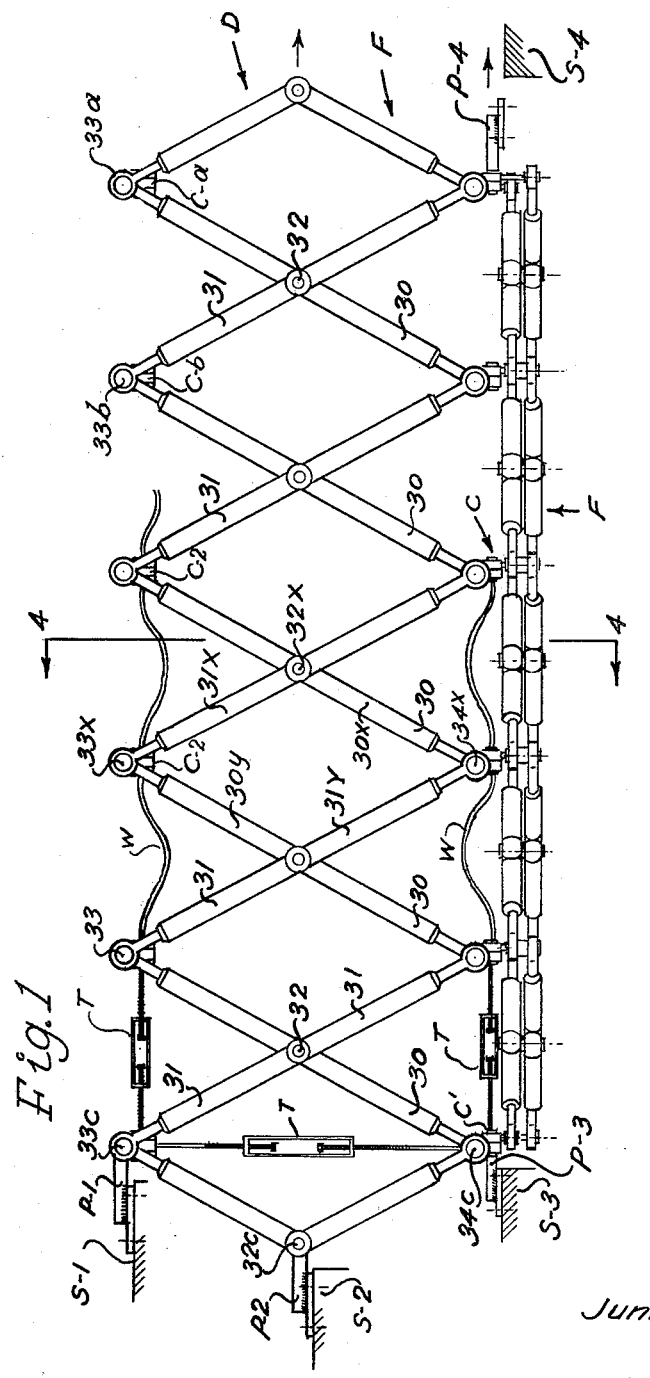
FIG. 1 is a side elevation illustrating one form of the present invention when used horizontally and further shows various types of locking or stabilizing members and the positions in which such members may be used.

In the drawings, the device of the present invention is indicated generally at D and is comprised of one or more side frames F which are pivotally connected together at connections C to form a structural unit. Each side frame F includes a plurality of frame members 30 which are pivotally connected at an intermediate point to a corresponding intermediate point of a plurality of frame members 31. Each end of each of the members 30 is pivotally connected to an end of one of the members 31 whereby the members 30 always remain parallel to each other and the members 31 always remain parallel to each other. The frame F may be extended to any pre-selected position desired and may also be collapsed. Locking or stabilizing members T are used to connect the members 30 and 31 to each other whereby the frame F may be locked or held stable at any desired extended position.

Referring now to FIG. 1 of the drawings, the device D is illustrated as being formed of three side frames F which are pivotally connected to each other at connections C, which connections will be more fully explained hereinafter, thereby forming a structural unit which may be extended and collapsed as such.

A type and several locations of locking and stabilizing members are also shown in FIG. 1. Turnbuckles T may be connected through or to the pivotal connections C in any one or all of the positions illustrated or any combination thereof, and may be located between any of the members 30 and 31 in any of the side frames F. Such turnbuckles T may be operated in the usual manner thereby extending or collapsing the frame F. A threaded bar (not shown) may be used in lieu of the turnbuckle or turnbuckles T, in which case the bar is threaded through the end connections C–a and C–b as explained more fully in connection with FIG. 11. A suitable handle (not shown) may be attached to the bar whereby the frame F may be extended or collapsed as the handle is rotated. Suitable wires or cables W may also be utilized to add rigidity to the frame F and could be inserted in openings in the connections C–2 as explained hereinafter in connection with FIG. 10. Such wires or cables W may be used in lieu of or in conjunction with the turnbuckles T or threaded bar B and may have their ends connected or attached to any of the connections C as well as to the turnbuckles T or threaded bar B.

FIG. 1 also illustrates additional types of locking or securing means which may be used to lock the frame F in a pre-selected extended position. Bars or plates P–1, P–2 and P–3 can be connected to any one or all of the pivotal connections 32c, 33c and C' as shown and such bars P–1, P–2 and P–3 can be attached to a support means S–1, S–2 and S–3, respectively, by any suitable means such as welding or the like if such connection is to be substantially permanent or by threading, clamping or the like if such connection is to be releaseable.

If the device D of FIG. 1 is to be used as a portable bridge, the device is extended across the gap desired to be bridged until the support plate or bar P–4 comes to rest on the ground or support S–4.

As seen in detail in FIG. 9, each member 30 is pivotally connected at 32 to a member 31. At an intermediate point on each of the members 30 and 31, holes 30a and 31a are provided which are adapted to be positioned adjacent each other and also to receive the bolt 40. A washer 41 may be inserted between the member 30 and the member 31 to facilitate the operation of the pivotal connection, and additional washers 42 and 43 may be placed on the bolt 40 between the head 40a of the bolt 40 and the member 31 and between the nut 44 and the member 30 for further facilitation of the pivotal movement, if desired. It should be noted, however, that the connection 32 could include numerous other types of connections such as pins, brads, cotter keys and the like without departing from the scope of the invention.

FIG. 4 is a cross-sectional view taken on line 4—4 of FIG. 1 and shows a plurality of the side frames F connected in a triangular shape with three of such side frames F connected together as shown. The pivotal connections C which connect together the side frames F extend throughout the length of each of the side frames F and join the ends of the adjacent frame members. As can be seen in FIG. 4, the frame F at the left of such figure has the numerals 30x, 30y, 31x, 31y, 32x, 33x and 34x which likewise appear on FIG. 1 to show the particular part of FIG. 1 which appears in FIG. 4. The bottom frame F and the side frame F appearing at the right hand side of FIG. 4 are likewise cut at the same positions as the side frame F at the left hand side of FIG. 4 and therefore appear accordingly. Such side frames F are all connected together by the pivotal connections C, various types of which are shown in particular in FIG. 8, and 10–14. The particular form of the connection C used between each of the frames F in FIG. 4 is preferably that type shown in FIG. 10 which will be described more in detail hereinafter. At this point it should be noted that the pivotal connection 33x includes a pivot pin or rod 45 which extends through an eye 46 on the member 30y and another eye 47 on the member 31x. In such manner, the eyes 46 and 47 may pivot with respect to each other on the pin 45 and the details thereof will be explained in conjunction with FIG. 10 in particular hereinafter. As will also be explained, the pin 45 is connected to a swivel connection forming the connection C permitting a pivoting action between the frames F. Each of such connections C has a cable W extending therefrom as shown which cable W becomes taut when the side frames F are extended outwardly so as to limit and hold such side frames F at the desired position. The length of the cables W will of course determine the position at which such frames F will be held. It should be noted that the frame member 30x has an eye 48 and the frame member 31y has a similar eye 49 through which pivot pin 50 extends to permit a pivotal movement of the members 30x and 31y with respect to each other. Such construction is identical with the construction of the pivotal connection at 33x and will also be more evident from the detail description in connection with FIG. 10 hereinafter. The same description which has been given above with respect to the side frame F at the left of FIG. 4 would apply to the side frame F at the bottom thereof and at the right hand side thereof, therefore additional detail description with respect to the other side frames F is not considered necessary.

In FIGS. 5 and 6, additional configurations for the structural unit D of FIG. 1 are illustrated. In FIG. 5, the frame F–1 is basically the same as the frame F previously described except that it is used by itself and would consist of a plurality of frame members 30 and 31 which are identical with the frame members 30 and 31 of the frame F previously described. Likewise, the pivotal connection 32 at the intermediate point where each pair of the members 30 and 31 cross each other would be the same as the pivotal connection 32 previously described in connection with the frame F. The pivotal connections 133 and 134 would correspond with the pivotal connection 33 and 34 of the frame F, but they would be modified because of the fact that such frame F–1 is not connected to any other side frame. Therefore, the cable W if used would come directly from the ring or bushing 133a and 134a. The cables W in FIG. 5 would serve to limit the amount of extension of the frame F–1 in the same way as the cable W in connection with FIGS. 1 and 4 and therefore the frame F–1 would be held by such cables W at a pre-determined or selected position depending upon the length of the cables W between the several pivotal connections 133 or 134. It will be understood of course that the cable W may extend only between the connections 133 or it may extend between the connections 134, but in any event, the cable W whether used at the upper connections 133 by itself or at the lower connections 134 by itself would prevent the amount of the extension of the frame F–1. Any of the other types of locking or holding means such as the turnbuckles T or threaded bar B or the holding plates P–1, P–2 and P–3 may likewise be used with the form of the invention shown in FIG. 5.

With respect to the form of the invention shown in FIG. 6, such construction is identical with that shown in FIG. 4 except that an additional side frame F is employed to form a four-sided structural unit. Additional, extra connections C–x and C–y are illustrated as extending from the basic four-sided structural unit composed of the four side frames F to indicate that the structural unit may be composed of a plurality of side frames F arranged in different relationships to each other. For example, FIG. 7 is a schematic illustration of one type of arrangement of a plurality of the frames F which would be connected together using any combination of the side frames F and the connections C. The specific connections C–x and C–y shown in FIG. 6 are also indicated in FIG. 7 to show the comparative relationship. Such connections C–x and C–y are merely the same type of connections as the connections C compounded to provide additional frame members attached to the same point of connection for pivotal movement.

Also, attention is directed to FIG. 7A which schematically shows another form of frame F–2 which is made up of a plurality of frame members such as indicated in FIG. 20 and which will be described more in detail hereinafter. The frame F–2 may be substituted for the frame F in each of the positions illustrated in FIGS. 1, 4, 5, 6 and 7.

In FIG. 15, a modified frame member 130 is illustrated. Such frame member 130 could be used in place of the frame members 30 and 31 in the forms of the invention heretofore described. The structure of the frame member 130 is believed evident from FIG. 15 and it includes a pair of crossing plates 130a and 130b (FIG. 21), each of which has a plurality of holes or perforations 130c therethrough for reducing the weight because normally such plates 130a and 130b would be formed of steel or similar relatively heavy metal. At the ends of the member 130, eyes 130d and 130e are provided for receiving a pivot pin to form the pivotal connection with the adjacent ends of the other members 130 forming the particular frame F in which the members 130 are used. At the intermediate part of the frame 130, and preferably at the mid-point thereof, an opening or hole is provided with inserts of 130f and 130g (FIG. 21) which have corresponding openings therethrough for receiving a pivot pin 140 therethrough to permit the adjacent members 130 to pivot with respect to each other. In FIG. 21, a pair of the frame members 130 are shown connected together with the pivot pin or rod 140 extending through the intermediate points of each of such members 130 for illustrating the manner in which they would be connected instead of the type of connection shown in FIG. 9. It will be appreciated of course that various other means for providing the pivotal connection at the intermediate portion of the adjacent frame member 130 can be provided within the scope of this invention, but the form shown in FIG. 21 is illustrative.

FIG. 16 shows another modified frame member 230 which is basically the same as the frame members 30 and 31 shown in FIGS. 1 and 4, except that the frame member 230 is tapered from the central portion thereof outwardly. Such member 230 has an opening 230a through its central portion for receiving a pivot pin such as the pin 40 shown in FIG. 9 and it has eyes 230b and 230c at each end thereof for receiving the pin such as the pins 45 and 50 in FIG. 4.

In FIG. 17, another modified frame member 330 is illustrated which is formed from a single wire or rod which is bent for forming the desired member 330. Such member 330 has a central opening or loop 330a which serves as the intermediate pivot opening while receiving the pivot pin or rod such as the rod 40 shown in FIG. 9. The eyes 330b and 330c at each end of the frame member 330 correspond with the eyes 230b and 230c of the frame member 230 and would be used in a similar manner.

In FIG. 18, another modified frame member 430 is provided which is also formed of a single piece of wire or rod which is bent to provide a central opening or loop 430a which corresponds with the opening or loop 330a and which would receive a central pivot pin such as the pin 40 shown in FIG. 9. The eyes of 430b and 430c at each end of the frame member 430 are adapted to receive the pivot pin such as the pins 45 and 50 shown in FIG. 4 and would of course provide for the same type of connections with the adjacent member which would normally be of the same construction as the member 430 itself shown in FIG. 18.

FIG. 19 illustrates a further modification and is designated with the numeral 530 wherein the frame member 530 is made of wood or similar relatively soft material which has a central recess 530a formed therein for receiving a wear washer or ring 531 therein. Such ring 531 is of known construction and will extend into the recess 530a only for approximately half of the width of such member 531. The other half of the ring 531 would extend into a similar recess to that shown as 530a in an adjacent member 530. In other words, the ring 531 would extend into a pair of adjacent recesses 530a in a pair of adjacent frame members 530. The recess 530 has a central hole 530b through which a pivot pin or rod such as the pin or rod 40 of FIG. 9 would extend. At each end of the side frame member 530, similar recesses 530c and 530d are provided with wear rings 532 and 533 inserted therein in the same manner as previously explained in connection with the ring 531.

In FIG. 20, a frame member 630 is illustrated which has a plurality of intermediate pivotal openings 630a formed therein between the ends thereof. Such intermediate openings 630a will be so positioned that they can form a frame work such as illustrated in FIG. 7A and each would receive a pivot pin or rod such as the pivot pin or rod 40 which would extend through crossing members 630 in the same manner as illustrated in FIG. 9. At each end of the frame member 630 eyes 630b and 630c would be provided for the end connections which would be identical with or similar to the end connections at the end of the members 30 and 31 in FIG. 1. The number of the intermediate openings 630a can be varied as desired to change the size of the frame. For example, in FIG. 7A, the frame F–2 shows the frame members 630 as having as many as three intermediate pivotal connections therefore each of the frame members 630 would have the corresponding number of pivotal openings.

Referring now to FIGS. 8 and 10–14, therein can be seen details of various types of pivotal connections C for joining together the ends of the frame members in adjacent side frames F or other similar side frames. Referring first to FIG. 10, portions of the frame members 30 and 31 from a pair of adjacent side frames F are illustrated. The frame members 30 and 31 at the upper portions of FIG. 10 are provided with an eye or clevis 46 and an eye 47, respectively, each of which have an opening therethrough, which openings are aligned with each other to receive a pivot pin or rod 45. The members 30 and 31 are thus free to rotate or pivot with respect to the rod or pin 45 and to each other. The rod 45 may have a nut (not shown) or any other suitable means on its outer end (upper part in FIG. 10) to prevent the eyes 46 and 47 from being inadvertently removed from the pin 45. For example, a cotter pin may be provided through the exposed end of the pin 45 or the pin 45 may simply be flattened or enlarged by hammering or other means to prevent the removal of the eyes 46 and 47 from the pin 45. The pin 45 has a clevis or bracket 51 which has an opening therethrough for receiving a tube or pivot member 52 about which the eye or bracket 51 may pivot. Such tube 52 has the cable W extending therethrough so that such cable W may move relative to the tube 52. However, if the cable W is to be secured to the particular connection C–2, the type of connection shown in FIG. 8 would normally be used as will be explained.

The lower frame members 30 and 31 shown in FIG. 10 have a clevis or eye 146 and 147 corresponding to the clevises 46 and 47, respectively, thereon for connection with a pivot pin or rod 145. Such pivot pin or rod 145 has an eye or loop 151 which has an opening therethrough for also receiving the pivot tube 52. The eye or loop 151 is also capable of pivoting with respect to the tube 52 and with respect to the clevis or bracket 51, although under normal circumstances, the bracket 51 and the eye or bracket 151 may be rigidly secured to the tube 52 since they normally will not need to pivot with respect to each other. The type of connection thus described in FIG. 10 would normally be used between each of the side frames F making up the particular structural unit D, but other types of connections besides the connection C–2 shown in FIG. 10 could be used as shown in FIGS. 8 and 11–14.

In connection with FIG. 8, the members 730 and 731 at the upper part have an eye or ring 746 and 747 on their respective ends which ring is adapted to receive a pin 745. One end of the pin 745 terminates in an eye or ring 751 and is adapted to receive a bolt 760. The lower portion of the connection C–1 is identical with the upper portion and the parts of the lower portion are identified with the same numerals as the upper portion. The bolt 760 is inserted in each of the rings 751 of the pins 745 wherein the rings 751 may pivot around the bolt 760, and a nut 761 is threaded on the threaded portion 760a of the bolt 760. The other end of the bolt 760 is formed into a ring 762 for receiving a loop or thimble 763 in which the wire W is secured thereon. A suitable flange or stop 760b is formed on the bolt 760 so as to inhibit longitudinal movement of the ring 751 on the bolt 760. The nut 761 has an extended portion 761a which has an opening 761b therein which is adapted to receive a loop or thimble 763 in which the wire W is secured. A suitable washer or bushing 765 may be positioned on the bolt 760 between each of the ring members 751 so as to aid their pivotal movement in relationship with each other. As in the C–2 connection, the pins 745 of the C–1 connection may be braded, threaded to receive a suitable nut, or have an opening therein for receiving a cotter key or the like.

The connection C–3 illustrated in FIG. 11 is similar to the connection C–2 illustrated in FIG. 10 and shows a member 830 with a rounded clevis 846 and a member 831 slightly modified from the member 31 but having a ring or eye 847 similar to the ring 47 in FIG. 10. A pin 845 is illustrated as being threaded on one end 845a for receiving a suitable nut similar to the nut 855 and having a ring 951 similar to that of ring 847 on its other end. A ring or washer 856 may be fixed to the bolt 845 to limit the movement of a clevis and ring similar to clevis 846 and ring 847, which may be positioned thereon. A pin 845′ has a clevis 851 similar to clevis 830 on the end thereof and an internally threaded sleeve or tube 852 is inserted in a suitable opening in the clevis 851 and adapted to receive the threaded bar B in lieu of the wire W. The sleeve 852 is also threaded externally on each end thereof so that suitable nuts 861 may be positioned on either side of the clevis 851. The ring 951 on the bolt or pin 845 also has an opening for receiving the tube 852. The external surface of the tube 852 is substantially smooth except for its threaded ends and permits the ring 951 and clevis 852 to pivot thereon.

The connection C–4 illustrated in FIG. 12 illustrates the use of a frame member such as 330 or 430 illustrated in FIGS. 17 and 18. The members 330 are fastened to a continuous ring 375 by means of their hooks or eyes 330b, 330c, 430b and 430c. The wires or cable W are secured on eyes or thimbles 363 which are fastened on the ring 375 and between each of the members 330 or 430. Any other suitable hook or eye arrangement may be used to fasten frame members similar to frame members 330 and 430 without departing from the scope of the invention.

The connection C–5 illustrated in FIG. 13 is similar to the connection C–4 shown in FIG. 12 but illustrates a form of a ring 475 in which the ring 475 is a part of or is formed on the end of a member 330′ or 430′. The members 330 and 430 are secured to the ring 475 of the member 330′ in a manner similar to that of securing or fastening the members 330 or 430 on the ring 375 in FIG. 12. In lieu of the wire or cable W, members such as the members 330 or 430 could be used.

The connection C–6 illustrated in FIG. 14 is similar to the connection C–2 illustrated in FIG. 10 except that a pin 452 is inserted through a clevis 451 and a ring 551, and brackets 475 are mounted on each end of the pin 452 with a suitable support plate 476 positioned thereon.

Referring now to FIG. 2 of the drawings, the device D is shown in a vertical position and utilizes three side frames F connected together by a plurality of connections C. Suitable wheel mounts M–1, M–2 and M–3 are extended from each of the lower connections C and have wheels R which are suitable for movement on a track A similar to that of a railroad track. Two of the wheel mounts M–1 and M–2 have threaded openings therein through which a threaded bar B–1 is threaded. One end of the bar B–1 is connected to a suitable gear G which is connected to a motor E by a belt X in a manner well known in the art. The motor E is also on a portable or movable mounting Y which has wheels Z also adapted to run on the track A. A fixed rod or shaft H is connected to the wheel mount nearest the motor E and to the wheel mount Y–1 of the movable mounting Y so that the device D and the motor E may be moved horizontally without disturbing the vertical operation of the structure D. The threaded bar B–1 is also provided with a handle 137 which may be operated to raise and lower the device D in lieu of using the motor E for turning the threaded bar B–1.

A support block 190 is secured to each of the three uppermost connections C and each of the support members 190 has an opening 190a extending laterally therethrough and adapted to receive a rod 192. As the structure D is raised or lowered, the blocks 190 move laterally on the rods 192 on which they are slidably positioned. Each of the rods 192 extends internally and is connected to a triangular rod 193 similar to the triangular rod 293 shown in FIG. 22. A suitable platform 194 is positioned on the supports 195 mounted on the rods 192. The supports 195 are illustrated as having openings 195a therein for receiving the rods 192, but could be secured to the rods 192 by welding or other suitable attachment means if desired.

The structural device D–1, illustrated in FIG. 3, is similar to that of the device D illustrated in FIG. 2, except that the members 30 and 31 in each of the side frames F are shortened successively as illustrated by the phantom lines shown in FIG. 3. The structure D–1 is supported by three mounts M–5 placed in a triangular relationship to each other, the position of which can be more easily seen in FIG. 22. A rod or support member 293 formed in a triangular shape is positioned in each of the support mountings M–5. A rod 292 extends from each of the mounting supports M–5 so as to form a horizontal support. Extending from each of the lowermost connections C is a support block 290 similar to that of 190 in FIG. 2 which is adapted to be slidably positioned on each of the rods 292, the position of which can also be more easily seen in FIG. 22. FIG. 3 also illustrates another means or method of raising and lowering the structure D, such means K being a hydraulic lift suitably supported on the ground and attached to the connection 32′. Such hydraulic lift K is operated in the usual manner. FIG. 3 also further illustrates the utility of the structure D–1 wherein blocks 295 similar to support blocks 190 in FIG. 2 are connected to two of the uppermost connections C and extend vertically therefrom and are adapted to receive a rod 296 therein. As the structure D–1 is raised and lowered the blocks 295 move laterally on the rod 296. A suitable pulley 297 may be positioned on the rod 296 for the usual purposes and as may be desired.

In FIG. 23 a modified form of the invention is illustrated which is particularly suited or adapted to be used as an arena for sporting or other events. In good weather the dome could be opened by lowering the sides and in bad weather the dome would be closed.

FIG. 23 illustrates the manner in which the side frame F may be connected together, utilizing successively smaller frame members 30″ and 31″. Each of the side frames F are connected together by a series of rods 80 adapted to be connected and slidably positioned in the connections C–7. The lowermost rods 80 are mounted or anchored at 81 by any suitable means such as the block or pillar 81 illustrated in FIG. 23.

FIG. 24 is a view along line 24—24 of FIG. 3 and shows additional detail wherein the frames F are joined together, with the parts in FIG. 24 numbered similarly to the parts in FIG. 23.

FIG. 25 is an enlarged view of the details of the connections V-7 which shows the members 30" and 31"' and how they are joined together. The member 30" has a ring 47" which is adapted to receive the rod or pin 45", and the member 31"' has a ring 46" which has an enlarged bore for permitting a limited lateral swinging or pivoting in addition to the normal rotative pivoting about the pin 45" and is adapted to receive the pin 45" also. A disc or bushing 83 having non-parallel sides 83a and 83b is positioned on the pin 45" between the rings 47" and 46" thereby permitting the member 31"' to be slanted inwardly so that the dome construction may be effected. A member 85 having an opening 85a adapted to receive the rod 80 slidably therein is connected to the pin 45". A suitable frame or skin (not shown) may be readily fitted or placed over the dome illustrated in FIG. 23 thereby adding additional rigidity to the structure.

Thus, it can be seen from the foregoing description and the drawings herewith that the device D of the present invention has numerous uses in various fields, and the examples described and illustrated herein are merely illustrative of such uses since other uses will occur to those skilled in the art.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A structural device comprising at least three lazy tong frames each of which has a plurality of pairs of lazy tong frame members, first link means connecting the merging ends of pairs of said frame members, second link means at the ends of said frame members for connecting pairs of said first link means together to form an extensible and collapsible unit of said frames and link means, the improvement residing in, cable means, means connecting said cable means to at least two of said second link means, and rigid means extending between at least two terminal ends of the frame members to lock said frames in an extended position with said cable means in a taut condition for assuming tension loads.

2. A structural device comprising at least three lazy tong frames each of which has a plurality of pairs of lazy tong frame members, first link means connecting the merging ends of pairs of said frame members, second link means at the ends of said frame members for connecting pairs of said first link means together to form an extensible and collapsible unit of said frames and link means, the improvement residing in, a plurality of cable means each of which has means therewith connecting same to at least two of said second link means, and rigid means to lock said frames in an extended position with said cables in a taut condition for assuming tension loads.

3. A structural device comprising at least three lazy tong frames each of which has a plurality of pairs of lazy tong frame members, first link means connecting the merging ends of pairs of said frame members, second link means at the ends of said frame members for connecting pairs of said first link means together to form an extensible and collapsible unit of said frames and link means, the improvement residing in said first and second link means, wherein one of each pair of said first link means has means therewith for pivoting in a first plane and the other of each pair of said first link means has means therewith for pivoting in a second plane which extends at an angle to said first plane, and wherein each of said second link means has means connecting same to a pair of said first link means for pivoting in a third plane which extends at an angle with respect to said first and second planes said last named means including first and second swivel members connected to adjacent first link means in each pair thereof, and means connecting said swivel members of each of said second link means for rotation together about a common axis, said common axis extending in a direction substantially parallel to the direction in which said frame members move upon extending and collapsing so as to relieve torsional stresses on said frame members and prevent racking when said unit is extended.

4. A structural device for a dome support, comprising a plurality of lazy-tong frames arranged side-by-side to form a closure, each of said frames including pairs of frame members connected at an intermediate pivot with said frame members being progressively smaller in length from the bottom pair upwardly, and link means connecting the merging ends of pairs of frame members, the improvement residing in, sliding support means connected to pairs of said link means for maintaining said frames together as said frames are extended and move towards and away from each other during such extension, and means forming a part of each link means for causing each successive pair of frame members in each frame to be slanted inwardly towards a central point as said frames are extended upwardly.

References Cited in the file of this patent

UNITED STATES PATENTS

| | | |
|---|---|---|
| 156,842 | Duggan | Nov. 17, 1874 |
| 195,747 | Davenport | Oct. 2, 1877 |
| 226,101 | Pfautz | Mar. 30, 1880 |
| 366,365 | Averberg | July 12, 1887 |
| 406,617 | Baker | July 9, 1889 |
| 861,775 | Stevenson | July 30, 1907 |
| 925,922 | Knappe et al. | June 22, 1909 |
| 1,095,391 | Fogle | May 5, 1914 |
| 1,511,679 | Schwartz | Oct. 14, 1924 |
| 1,708,113 | Allen | Apr. 9, 1929 |
| 1,947,647 | Holden | Feb. 20, 1934 |
| 2,402,579 | Ross | June 25, 1946 |
| 2,697,845 | Broner | Dec. 28, 1954 |

FOREIGN PATENTS

| | | |
|---|---|---|
| 655,970 | Great Britain | Aug. 8, 1951 |